United States Patent
Ichimura et al.

(10) Patent No.: US 10,514,039 B2
(45) Date of Patent: Dec. 24, 2019

(54) HYDRAULIC CONTROL DEVICE (71) Applicant: HONDA MOTOR CO., LTD., Minato-ku, Tokyo (JP)

(72) Inventors: Yasuyuki Ichimura, Wako (JP); Shigeji Nakano, Wako (JP); Satoshi Uchino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 15/986,851

(22) Filed: May 23, 2018

(65) Prior Publication Data

US 2018/0340538 A1 Nov. 29, 2018

(30) Foreign Application Priority Data

May 26, 2017 (JP) ................... 2017-104660

(51) Int. Cl.
*F15B 7/00* (2006.01)
*F04D 15/00* (2006.01)

(52) U.S. Cl.
CPC .......... *F04D 15/0066* (2013.01); *F15B 7/001* (2013.01)

(58) Field of Classification Search
CPC .. F15B 7/001; F04D 15/0066; F16H 57/0446; F16H 57/04; F16H 57/0439; H02K 21/00; H02K 7/00
See application file for complete search history.

(56) References Cited

U.S. PATENT DOCUMENTS

| 5,665,022 A | * | 9/1997 | Niiyama | F16H 61/66259 474/18 |
| 6,358,181 B1 | * | 3/2002 | Friedmann | F16H 61/662 477/37 |
| 7,707,911 B2 | * | 5/2010 | Grethel | F16H 61/0031 192/3.57 |
| 8,386,138 B2 | * | 2/2013 | Nihei | F16D 48/066 701/21 |
| 2015/0330519 A1 | * | 11/2015 | Maurer | F16K 11/04 137/565.26 |
| 2017/0009877 A1 | * | 1/2017 | Ichimura | F16H 61/0206 |

FOREIGN PATENT DOCUMENTS

| JP | 2006-057757 | | 3/2006 |
| JP | 2006057757 A | * | 3/2006 |
| JP | 2010-096287 | | 4/2010 |
| JP | 2015-200369 | | 11/2015 |
| JP | 2015200369 A | * | 11/2015 |
| JP | 2016-008631 | | 1/2016 |

* cited by examiner

*Primary Examiner* — Thomas E Lazo
(74) *Attorney, Agent, or Firm* — Amin, Turocy & Watson, LLP (57) ABSTRACT

In a hydraulic control device, when the rotational speed of an electric motor is an appropriate rotational speed, a first spool is in a first position, in which communication between a sixth port and a second port is blocked. When the rotational speed of the electric motor exceeds the appropriate rotational speed, the first spool is in a second position, in which the sixth port and the second port are placed in communication.

5 Claims, 5 Drawing Sheets

HYDRAULIC CONTROL DEVICE

CROSS-REFERENCE TO RELATED APPLICATION

This application is based upon and claims the benefit of priority from Japanese Patent Application No. 2017-104660 filed on May 26, 2017, the contents of which are incorporated herein by reference.

BACKGROUND OF THE INVENTION

Field of the Invention

The present invention relates to a hydraulic control device adapted to control a hydraulic pressure supplied to a transmission.

Description of the Related Art

Japanese Laid-Open Patent Publication No. 2015-200369 aims to provide a hydraulic control device that supplies a hydraulic pressure to a supplied part to which a low hydraulic pressure is supplied, and to a hydraulic pressure operated unit to which a high hydraulic pressure is supplied wherein the hydraulic control device is capable of efficiently driving an oil pump.

In order to solve the aforementioned problem, in Japanese Laid-Open Patent Publication No. 2015-200369, there are provided a large capacity oil pump, a small capacity oil pump that supplies the high hydraulic pressure to the hydraulic pressure operated unit and has a smaller capacity than the large capacity oil pump, a first flow passage, a second flow passage, and a third flow passage. The small capacity oil pump further pressurizes the supplied hydraulic pressure and supplies the further pressurized hydraulic pressure to the hydraulic pressure operated unit.

The first flow passage supplies the hydraulic pressure supplied from the large capacity oil pump to the small capacity oil pump. The second flow passage supplies the hydraulic pressure supplied from the small capacity oil pump to the hydraulic pressure operated unit. The third flow passage supplies the hydraulic pressure supplied from the large capacity oil pump to the hydraulic pressure operated unit not through the small capacity oil pump. Further, a pressure control valve is connected to the first flow passage between the large capacity pump and the small capacity pump.

SUMMARY OF THE INVENTION

Concerning the pressure control valve, which is one constituent element of the hydraulic control device, there is a problem in that, when the rotational speed of an electric motor of the small capacity oil pump exceeds an appropriate rotational speed, a valve body of the pressure control valve moves longer than a specified stroke (over-stroking occurs) whereby the hydraulic pressure decreases when the valve body returns.

Thus, suppressing the aforementioned over-stroke condition may be thought of by controlling with high precision the rotation of the electric motor of the small capacity oil pump with a hydraulic pressure sensor that detects the hydraulic pressure from the pressure control valve and with a separately incorporated control circuit. However, since it is necessary to separately incorporate the hydraulic pressure sensor, the control circuit, and the like, a new problem of increasing costs occurs.

The present invention has been devised in order to solve the aforementioned problem, and has the object of providing a hydraulic control device into which a hydraulic pressure sensor or a control circuit need not be newly incorporated and that suppresses the over-stroke condition of the valve body of the pressure control valve with a simple configuration, whereby the hydraulic control device is advantageous in terms of cost.

[1] The hydraulic control device according to the present invention includes the following features. More specifically, the hydraulic control device includes a mechanical oil pump, an electric oil pump having an electric motor, a pressure control valve connected between the mechanical oil pump and the electric oil pump, a first flow passage adapted to supply an oil flow from the electric oil pump to a transmission, and a second flow passage, which branches off from a midstream location of the first flow passage, and is adapted to supply a portion of the oil flow exiting from the electric oil pump to the pressure control valve.

The pressure control valve includes a first supply port to which an oil flow from the mechanical oil pump is supplied, a first discharge port adapted to transmit the oil flow from the mechanical oil pump to the electric oil pump, a second supply port to which the oil flow from the second flow passage is supplied, a third supply port to which a pilot pressure from the second flow passage is supplied, and a valve body which is moved by the pilot pressure supplied from the third supply port.

When the rotational speed of the electric motor is an appropriate rotational speed, the valve body is in a first position, in which communication between the second supply port and the first discharge port is blocked, and when the rotational speed of the electric motor exceeds the appropriate rotational speed, the valve body is in a second position, in which the second supply port and the first discharge port are placed in communication.

The electric oil pump further pressurizes the hydraulic pressure which is supplied from the mechanical oil pump through the pressure control valve, and supplies it to the transmission. Accordingly, in the case that the rotational speed of the electric motor of the electric oil pump is not in excess of the appropriate rotational speed, since the pilot pressure is lower than a predetermined value, the valve body is in the first position in which communication between the second supply port and the first discharge port is blocked.

In addition, when the rotational speed of the electric motor exceeds the appropriate rotational speed, since the pilot pressure exceeds the predetermined value, the valve body is moved to the second position in which the second supply port and the first discharge port are placed in communication.

Consequently, due to the fact that the second supply port and the first discharge port communicate with each other, the oil flow entering into the pressure control valve from the second flow passage via the second supply port can be released into the first discharge port. More specifically, the pressure of the oil flow that flows through the second flow passage can be released into the first discharge port, and thus rising of the pilot pressure applied to the valve body can be suppressed.

As a result, it is possible to prevent the valve body of the pressure control valve from moving longer than its specified stroke, and it is possible to solve the problem in which the hydraulic pressure decreases when the valve body returns. In addition, there is no need to install a hydraulic pressure sensor to detect the hydraulic pressure from the pressure control valve, or to incorporate a separate control circuit, which is advantageous in terms of cost.

[2] In the present invention, the pressure control valve, the first discharge port, and the second supply port may be disposed adjacent to each other, and the first discharge port and the second supply port may be arranged in this order along a direction in which the valve body is moved by the pilot pressure. When the valve body is in the first position, the first supply port and the first discharge port may be placed in communication, and communication between the second supply port and the first discharge port may be blocked, and when the valve body is in the second position, the first supply port and the first discharge port may be placed in communication, and the second supply port and the first discharge port may be placed in communication.

More specifically, due to the fact that the first discharge port and the second supply port are arranged adjacent to each other, and the first discharge port and the second supply port are arranged in this order along the direction in which the valve body is moved by the pilot pressure, the following actions are exhibited.

Since the valve body is in the first position during the period in which the valve body moves accompanying the rise in the pilot pressure, and the pilot pressure is lower than the predetermined value, the oil flow from the mechanical oil pump, which is supplied through the first supply port, is supplied to the electric oil pump through the first discharge port.

Since the valve body is in the second position during the period in which the pilot pressure is in excess of the predetermined value, the pressure of the oil flow flowing through the second flow passage can be released into the first discharge port, and a rise in the pilot pressure applied to the valve body can be suppressed.

[3] In the present invention, there may further be included a low pressure operated device, and a low pressure side passage adapted to supply the oil flow from the pressure control valve to the low pressure operated device, and the pressure control valve may have a second discharge port adapted to transmit the oil flow from the mechanical oil pump to the low pressure side flow passage. When the valve body is in the first position, communication between the first supply port and the second discharge port may be blocked, and when the valve body is in a third position located more closely to the first position than the second position, the third supply port and the second discharge port may be placed in communication.

In the case that the rotational speed of the electric motor of the electric oil pump is not in excess of the appropriate rotational speed, since the pilot pressure is lower than the predetermined value, the valve body is placed in the first position. At this time, since communication between the first supply port and the second discharge port is blocked, the oil flow supplied through the first supply port is supplied exclusively to the electric oil pump through the first discharge port.

Since the electric oil pump further pressurizes the hydraulic pressure which is supplied from the mechanical oil pump through the pressure control valve, and supplies it to the transmission, the pilot pressure supplied to the third supply port through the second flow passage rises.

When the valve body reaches the third position by elevation of the pilot pressure, the first supply port and the second discharge port are placed in communication, and the oil flow supplied through the first supply port is supplied to the electric oil pump through the first discharge port, together with being supplied to the low pressure operated device through the second discharge port.

In addition, when the pilot pressure further rises, exceeds the predetermined value, and the valve body arrives at the second position, due to the fact that the second supply port and the first discharge port are placed in communication, the oil flow from the electric oil pump, which is supplied through the second flow passage and the second supply port, is supplied to the electric oil pump through the first outlet and the first flow passage. More specifically, the pressure of the oil flow that flows through the second flow passage can be released into the first discharge port, and thus rising of the pilot pressure applied to the valve body can be suppressed.

In this manner, in the hydraulic control device, which supplies the oil flow from the mechanical oil pump to the electric oil pump, as well as to the low pressure operated device, it is possible to prevent the valve body of the pressure control valve from moving longer than its specified stroke, and it is possible to solve the problem in which the hydraulic pressure decreases when the valve body returns. In addition, there is no need to install a hydraulic pressure sensor to detect the hydraulic pressure from the pressure control valve, or to incorporate a separate control circuit, which is advantageous in terms of cost.

[4] In the present invention, in the pressure control valve, the second discharge port and the first discharge port may be disposed adjacent to each other, the first discharge port and the second supply port may be disposed adjacent to each other, and the second discharge port, the first discharge port, and the second supply port may be arranged in this order along a direction in which the valve body is moved by the pilot pressure. When the valve body is in the first position, the first supply port and the first discharge port may be placed in communication, and communication between the first supply port and the second discharge port and communication between the first discharge port and the second discharge port may be blocked. When the valve body is in the third position, the first supply port and the first discharge port may be placed in communication, the first supply port and the second discharge port may be placed in communication, and the first discharge port and the second discharge port may be placed in communication. When the valve body is in the second position, the first supply port and the first discharge port may be placed in communication, and the second supply port and the first discharge port may be placed in communication.

Due to the fact that the second discharge port and the first discharge port are arranged adjacent to each other, and the first discharge port and the second supply port are arranged adjacent to each other, and the second discharge port, the first discharge port, and the second supply port are arranged in this order along the direction in which the valve body is moved by the pilot pressure, the following actions are exhibited.

More specifically, the valve body can be placed in the first position during the period in which the valve body moves accompanying the rise in the pilot pressure and the pilot pressure is lower than the predetermined value, and the oil flow from the mechanical oil pump, which is supplied through the first supply port, is supplied to the electric oil pump through the first discharge port.

Thereafter, during the second period in which the valve body moves accompanying the rise of the pilot pressure, and the pilot pressure is lower than the predetermined value, the valve body can be placed in the third position, and the oil flow, which is supplied through the first supply port, is supplied to the electric oil pump through the first discharge port, together with being supplied to the low pressure operated device through the second discharge port.

Thereafter, the valve body can be placed in the second position during the period in which the pilot pressure is in excess of the predetermined value, the pressure of the oil flow flowing through the second flow passage can be released into the first discharge port, and a rise in the pilot pressure applied to the valve body can be suppressed.

In accordance with the hydraulic pressure control device according to the present invention, there is no need for a hydraulic pressure sensor or a control circuit to be newly incorporated therein, and with a simple configuration, it is possible to suppress an over-stroke condition of the valve body of the pressure control valve, while in addition, the hydraulic control device is advantageous in terms of cost.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

An embodiment of a hydraulic control device according to the present invention will be described below with reference to FIGS. 1 to 5.

Figure 1:
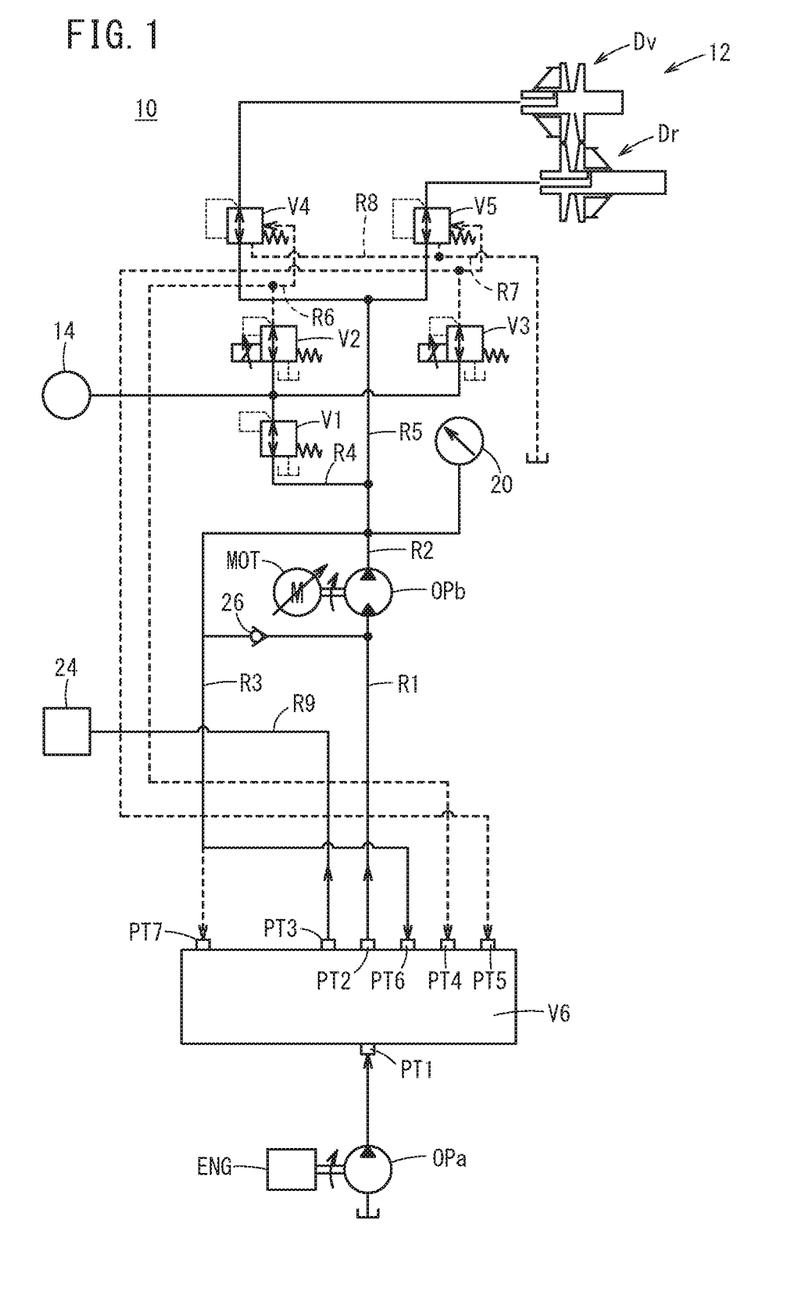
FIG. 1 is a hydraulic circuit diagram showing a configuration of a hydraulic control device according to an embodiment of the present invention.

Initially, as shown in FIG. 1, the hydraulic control device 10 according to the present embodiment includes a mechanical oil pump OPa (large capacity oil pump), which is driven by an internal combustion engine ENG, and an electric oil pump OPb (small capacity oil pump), which is driven by an electric motor MOT. The hydraulic control device 10 is used in a so-called belt type or chain type continuously variable transmission 12 (a so-called friction drive).

The continuously variable transmission 12 includes a pair of input side pulleys Dv, a pair of output side pulleys Dr, and a belt or chain (not shown), which is capable of transmitting power between the input side pulleys Dv and the output side pulleys Dr.

The pair of input side pulleys Dv is made up from a pulley (movable side pulley), which is freely movable along an input shaft (not shown) of the continuously variable transmission 12, and a fixed pulley (fixed side pulley). Depending on the supply of oil, a side pressure of the movable side pulley of the input side pulleys Dv changes, and the width of the input side pulleys Dv in the axial direction of the input shaft changes. In this manner, by adjusting the supplied oil, a clamping pressure of the belt between the pair of input side pulleys Dv is adjusted.

The pair of output side pulleys Dr is made up from a pulley (movable side pulley), which is freely movable along an output shaft (not shown) of the continuously variable transmission 12, and a fixed pulley (fixed side pulley). Depending on the supply of oil, a side pressure of the movable side pulley of the output side pulleys Dr changes, and the width of the output side pulleys Dr in the axial direction of the output shaft changes. In this manner, by adjusting the supplied oil, a clamping pressure of the belt between the pair of output side pulleys Dr is adjusted.

In this instance, in the input side pulleys Dv and the output side pulleys Dr, the side pressure refers to a pressure that presses the input side pulley Dv and the output side pulley Dr on the movable side toward the input side pulley Dv and the output side pulley Dr on the fixed side, along the axial direction of the input shaft and the output shaft. As the side pressure increases and the clamping pressure increases, the winding radius of the belt on the input side pulleys Dv or the output side pulleys Dr increases. The gear ratio of the continuously variable transmission 12 is controlled by controlling the hydraulic pressure (and more specifically, by controlling the side pressure or the clamping pressure) supplied to the input side pulleys Dv and the output side pulleys Dr.

The input side pulleys Dv, the output side pulleys Dr, and a clutch 14 which is operated at a high hydraulic pressure correspond to a hydraulic pressure operated unit (high pressure system). Moreover, as the clutch 14, there may be cited, for example, a starting clutch or a forward-reverse clutch of a forward-reverse switching mechanism.

The hydraulic control device 10 is equipped with a first pressure control valve V1 through a sixth pressure control valve V6, and a first oil passage R1 through a ninth oil passage R9.

The second pressure control valve V2 and the third pressure control valve V3 are pressure control valves, which enable the hydraulic pressure to be arbitrarily changed in accordance with a current supplied to a linear solenoid thereof. Further, the second pressure control valve V2 and the third pressure control valve V3 are constituted as so-called normally open type valves, in which a primary side port (not shown) and a secondary side port (not shown) are placed in communication, in a state in which electric power is not supplied to the linear solenoid thereof. The fourth pressure control valve V4 and the fifth pressure control valve V5 are pilot operation type pressure control valves, and are pressure control valves which enable the hydraulic pressure to be arbitrarily changed by changing a pilot pressure supplied from the exterior.

On the other hand, the oil flow from the mechanical oil pump OPa, which is driven by the internal combustion engine ENG, is supplied to the first oil passage R1 and the ninth oil passage R9 via a later-described sixth pressure control valve V6. The oil flow supplied to the first oil passage R1 is discharged toward the electric oil pump OPb. The oil flow supplied to the ninth oil passage R9 is discharged toward a low pressure operated device 24 (for example, an operated member requiring lubrication or cooling by oil, or a lockup clutch of a torque converter or the like, which is operated at low pressure) for which a comparatively low hydraulic pressure (low hydraulic pressure) is sufficient.

The electric oil pump OPb further pressurizes the hydraulic pressure supplied from the first oil passage R1, and outputs it to the second oil passage R2. The third oil passage R3, which is branched off from the second oil passage R2, is connected to the later-described sixth pressure control valve V6. Moreover, a check valve 26 is provided between the first oil passage R1 and the third oil passage R3. The check valve 26 is provided so as to allow the oil to flow in a direction from the first oil passage R1 to the third oil passage R3, and to prevent the oil from flowing in a direction opposite to the aforementioned direction.

The third oil passage R3 is connected to the fourth oil passage R4 and the fifth oil passage R5. Further, a hydraulic pressure gauge 20 is provided to enable measurement of the hydraulic pressure of a connected portion between the second oil passage R2 and the third oil passage R3.

The fourth oil passage R4 is connected to the first pressure control valve V1. The first pressure control valve V1 reduces the pressure of the hydraulic pressure supplied from the fourth oil passage R4 so as to attain a predetermined pressure. The first pressure control valve V1 supplies the hydraulic pressure, which has been reduced in pressure, to each of the second pressure control valve V2, the third pressure control valve V3, and the clutch 14, which is mounted in the vehicle.

The second pressure control valve V2 reduces the pressure of the supplied hydraulic pressure so as to attain the pilot pressure of the fourth pressure control valve V4, and outputs it to the fourth pressure control valve V4 through the sixth oil passage R6. The third pressure control valve V3 reduces the pressure of the supplied hydraulic pressure so as to attain the pilot pressure of the fifth pressure control valve V5, and outputs it to the fifth pressure control valve V5 through the seventh oil passage R7.

The fifth oil passage R5 is connected to the fourth pressure control valve V4 and the fifth pressure control valve V5. The fourth pressure control valve V4 reduces the pressure of the hydraulic pressure supplied from the fifth oil passage R5 to a predetermined pressure corresponding to the pilot pressure supplied from the second pressure control valve V2, and supplies it to the input side pulleys Dv. In the case that the hydraulic pressure of the input side pulleys Dv becomes greater than or equal to the predetermined pressure, the fourth pressure control valve V4 discharges a surplus amount of oil from a drain port (not shown) of the fourth pressure control valve V4 into the eighth oil passage R8, whereby the oil pressure of the input side pulleys Dv is maintained at the predetermined pressure.

The fifth pressure control valve V5 reduces the pressure of the hydraulic pressure supplied from the fifth oil passage R5 to a predetermined pressure corresponding to the pilot pressure supplied from the third pressure control valve V3, and supplies it to the output side pulleys Dr. Further, in the case that the hydraulic pressure of the output side pulleys Dr becomes greater than or equal to the predetermined pressure, the fifth pressure control valve V5 discharges a surplus amount of oil from a drain port (not shown) of the fifth pressure control valve V5 into the eighth oil passage R8, whereby the oil pressure of the output side pulleys Dr is maintained at the predetermined pressure.

When the width of the input side pulleys Dv is widened, the oil is discharged from the input side pulleys Dv. The discharged oil flows into the fourth pressure control valve V4, and is discharged from a drain port (not shown) of the fourth pressure control valve V4 into the eighth oil passage R8. When the width of the output side pulleys Dr is widened, the oil is discharged from the output side pulleys Dr. The discharged oil flows into the fifth pressure control valve V5, and is discharged from a drain port (not shown) of the fifth pressure control valve V5 into the eighth oil passage R8.

The oil discharged from the pulleys having a wider width from among the input side pulleys Dv and the output side pulleys Dr flows into the eighth oil passage R8. The oil that is discharged at this time is the oil that has entered into an oil chamber of the pulleys in a pressurized state, and is in a state in which pressure is applied thereto.

In addition, in the present embodiment, the sixth pressure control valve V6 is connected between the mechanical oil pump OPa, which is driven by the internal combustion engine ENG, and the first oil passage R1 and the ninth oil passage R9.

Figure 2:
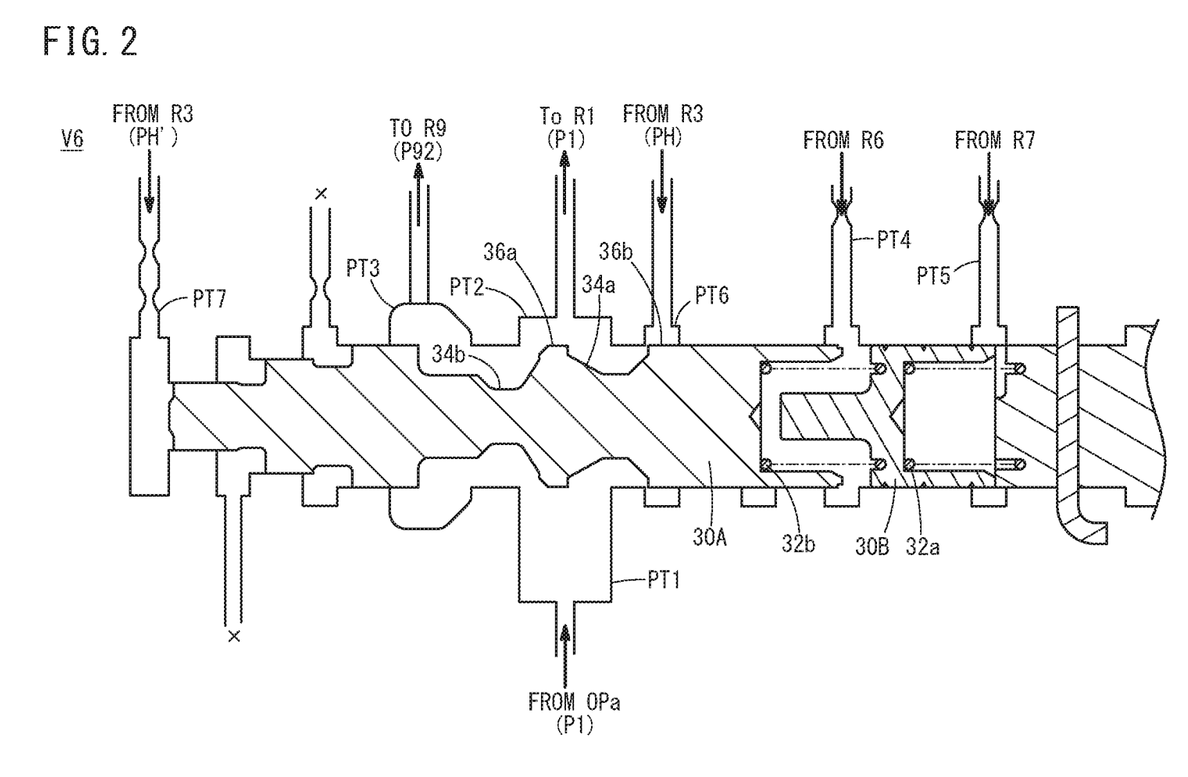
FIG. 2 is a cross-sectional view schematically showing a sixth pressure control valve.
Figure 3:
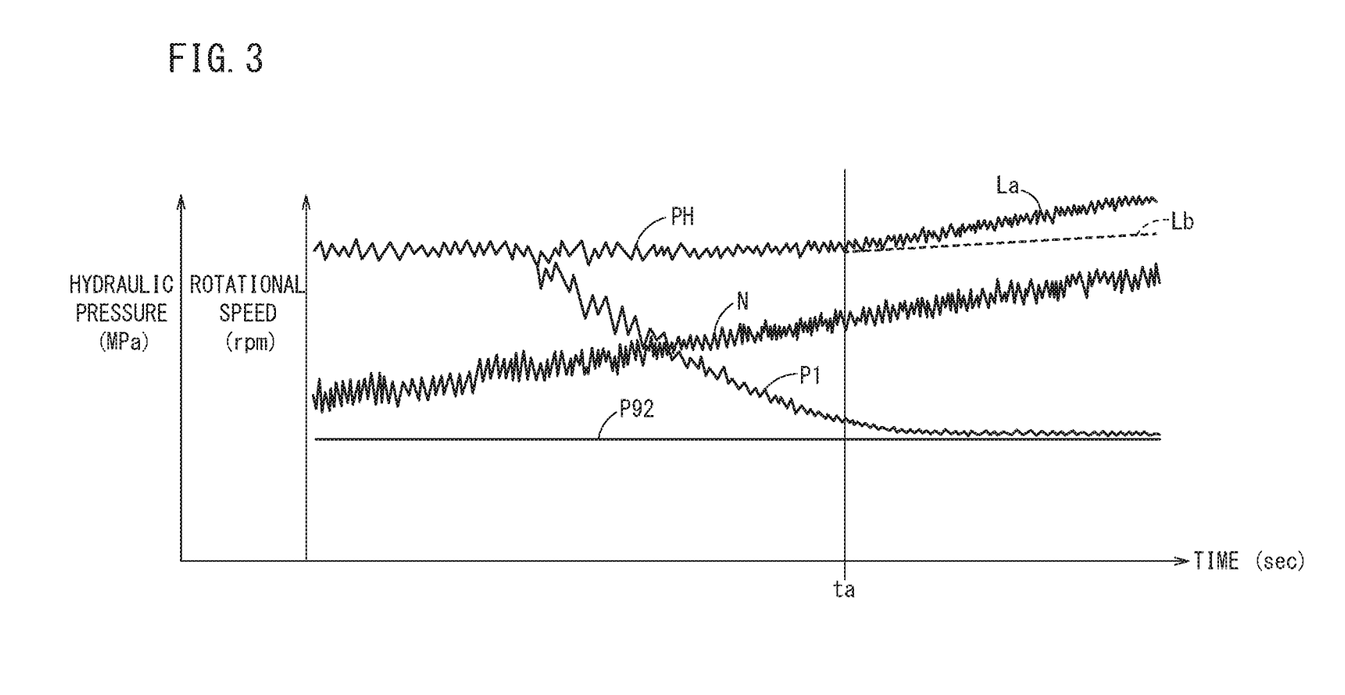
FIG. 3 is a graph showing changes in a hydraulic pressure PH, a hydraulic pressure P1, and a hydraulic pressure P92 of a fourth oil passage, and a rotational speed of an electric motor with respect to the passage of time.

As shown in FIG. 2, the sixth pressure control valve V6 is equipped with a first spool 30A (valve body) and a second spool 30B. The second spool 30B is biased toward the first spool 30A by a first elastic member 32a constituted by a spring. The first spool 30A is biased toward a side away from the second spool 30B by a second elastic member 32b that is constituted by a spring and is disposed between the first spool 30A and the second spool 30B.

Further, the sixth pressure control valve V6 is equipped with seven ports (a first port PT1 through a seventh port PT7). The hydraulic pressure P1 from the mechanical oil pump OPa is supplied to the first port PT1 (first supply port). The second port PT2 (first discharge port) is disposed at the same position in the axial direction as the first port PT1, and is connected to the first oil passage R1. The third port PT3 (second discharge port) is disposed on a side that is distanced from the second spool 30B more so than the second port PT2, and is connected to the ninth oil passage R9 that is joined to the low pressure operated device 24.

The fourth port PT4 is disposed at a location corresponding to the second spool 30B, and at a location in proximity to the first spool 30A, and a pilot pressure for the fourth pressure control valve V4 which is output from the second pressure control valve V2, that is, a pilot pressure supplied through the sixth oil passage R6, is supplied thereto. The fifth port PT5 is disposed on a side more remote from the first spool 30A than the fourth port PT4. A pilot pressure for the fifth pressure control valve V5 which is output from the third pressure control valve V3, that is, a pilot pressure supplied through the seventh oil passage R7, is supplied to the fifth port PT5.

The sixth pressure control valve V6 compares the pilot pressure output from the second pressure control valve V2 with the pilot pressure output from the third pressure control valve V3, and whichever of the pilot pressures is higher acts as a force to move the first spool 30A in a direction to separate away from the second spool 30B.

The sixth port PT6 (second supply port) is disposed between the second port PT2 and the fourth port PT4, at a location corresponding to the first spool 30A, and the hydraulic pressure PH of the oil flow in the fourth oil passage R4 is supplied to the sixth port PT6. The seventh port PT7 (third supply port) is disposed on a side more remote from the second spool 30B than the third port PT3, and a pilot pressure PH' of the oil flow in the fourth oil passage R4 is supplied to the seventh port PT7.

In accordance with the pilot pressure PH' supplied through the seventh port PT7, the sixth pressure control valve V6 generates a force in a direction to make the first spool 30A approach toward the second spool 30B in opposition to the biasing force of the second elastic member 32b.

Further, a first annular groove 34a and a second annular groove 34b are formed in the first spool 30A, at positions corresponding respectively to the first port PT1 and the third port PT3. A first outer circumferential surface 36a of the first spool 30A is formed between the first annular groove 34a and the second annular groove 34b, and a second outer circumferential surface 36b is formed on the side of the second spool 30B from a terminal end (an end close to the second spool 30B) of the first annular groove 34a.

Next, operations of the hydraulic control device 10, and principally, operations of the sixth pressure control valve V6, will be described together with a reference example. In the reference example, although not shown, the sixth port PT6 does not exist.

At first, in the hydraulic control device 10, in order to appropriately adjust the gear ratio of the continuously variable transmission 12, at least the higher one from among the hydraulic pressures required for the input side pulleys Dv and the output side pulleys Dr is supplied to the fourth oil passage R4 and the fifth oil passage R5.

Thus, according to the present embodiment, the pilot pressure of the hydraulic pressure supplied to the fourth oil passage R4 and the fifth oil passage R5, and more specifically, the pilot pressure PH' of the oil flow in the third oil passage R3, is supplied to the seventh port PT7, whereby the flow rate of the oil discharged from the second port PT2 fluctuates in accordance with variations in the hydraulic pressure supplied to the fourth oil passage R4 and the fifth oil passage R5. Consequently, the hydraulic pressure supplied to the fourth oil passage R4 and the fifth oil passage R5 is kept at a line pressure, and the pilot pressure is also maintained at a constant value. More specifically, if the rotational speed of the electric motor MOT of the electric oil pump OPb is the appropriate rotational speed, the pilot pressure is kept constant in both the present embodiment and the reference example.

In such a case, when the rotational speed of the electric motor MOT of the electric oil pump OPb exceeds the appropriate rotational speed, in the reference example, the oil pressure PH of the third oil passage R3 rises (refer to the characteristic La in FIG. 3), and corresponding thereto, the pilot pressure PH' supplied to the seventh port PT7 of the sixth pressure control valve V6 also rises. As a result, the first spool 30A moves toward the side of the second spool 30B longer than the specified stroke (over-stroking occurs), and the hydraulic pressure decreases upon return of the first spool 30A. Moreover, in FIG. 3, changes in the hydraulic pressure PH, the hydraulic pressure P1, and a hydraulic pressure P92 of the third oil passage R3, and a rotational speed N of the electric motor MOT with respect to the passage of time are shown.

In contrast thereto, according to the present embodiment, the following operations are performed. First, at an initial stage shown in FIG. 4A, namely, at a stage at which one end portion (the end portion on the side of the seventh port PT7) of the first spool 30A is in contact with a side wall of the seventh port PT7, the first outer circumferential surface 36a is positioned between the third port PT3 and the second port PT2, and the second outer circumferential surface 36b is positioned at the sixth port PT6 (first position). At this stage, although the first port PT1 and the second port PT2 are placed in communication, communication between the first port PT1 and the third port PT3 is blocked. Therefore, the oil flow from the first port PT1 is supplied exclusively to the first oil passage R1 through the second port PT2. At this time, the sixth port PT6 is closed by the second outer circumferential surface 36b.

Figure 4A:
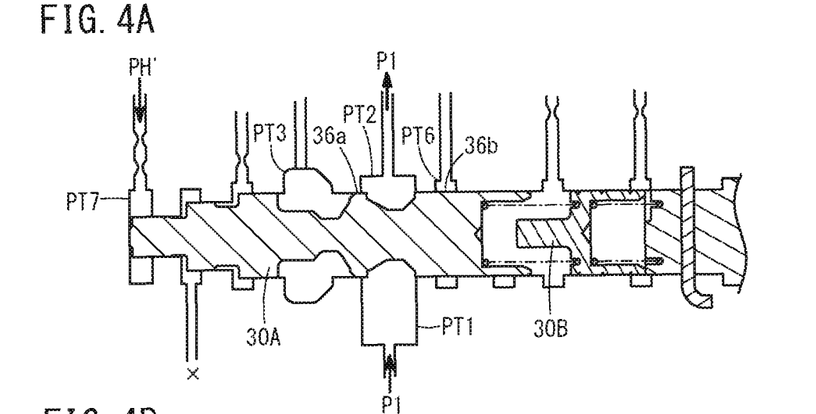
FIG. 4A is a cross-sectional view schematically showing a state in which a first spool is in a first position.
Figure 4B:
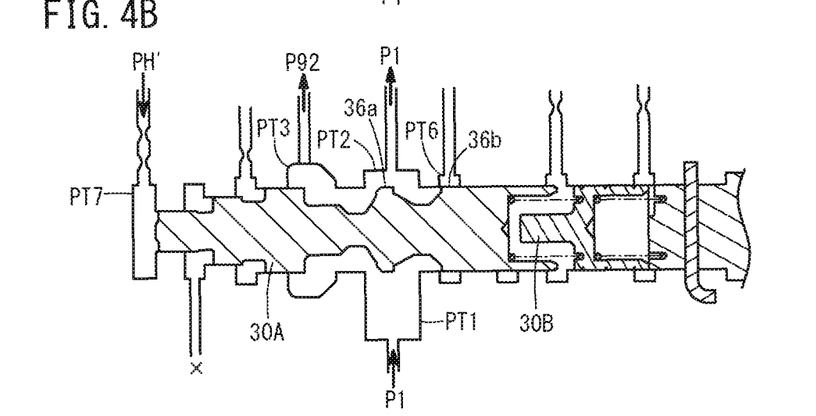
FIG. 4B is a cross-sectional view schematically showing a state in which the first spool is in a third position.

Thereafter, as the pilot pressure PH' rises, the first spool 30A moves toward the second spool 30B. As shown in FIG. 4B, when the first outer circumferential surface 36a faces toward the first port PT1 and the second port PT2, the first port PT1 and the third port PT3 are placed in communication, and the oil flow from the first port PT1 flows through the second port PT2 and is supplied as a hydraulic pressure P1 to the first oil passage R1, and together therewith, flows through the third port PT3, and is supplied as a hydraulic pressure P92 to the ninth oil passage R9 (third position). The sixth port PT6 is still kept closed by the second outer circumferential surface 36b.

In addition, in the case that the rotational speed of the electric motor MOT of the electric oil pump OPb is the appropriate rotational speed, while the hydraulic pressure PH of the third oil passage R3 is raised and lowered repeatedly over a short time period, the pilot pressure PH' (not shown in FIG. 3) is controlled to remain substantially constant so as not to exceed the predetermined value. As the predetermined value, there may be cited the value of the pilot pressure PH' at the point in time, for example, the point in time indicated by time "ta" in FIG. 3, when the difference between the oil pressure P1 discharged from the second port PT2 and the oil pressure P92 discharged from the third port PT3 becomes less than 0.1 MPa. A specific predetermined value may be appropriately selected according to the variation of the sixth pressure control valve V6 or the like.

Figure 4C:
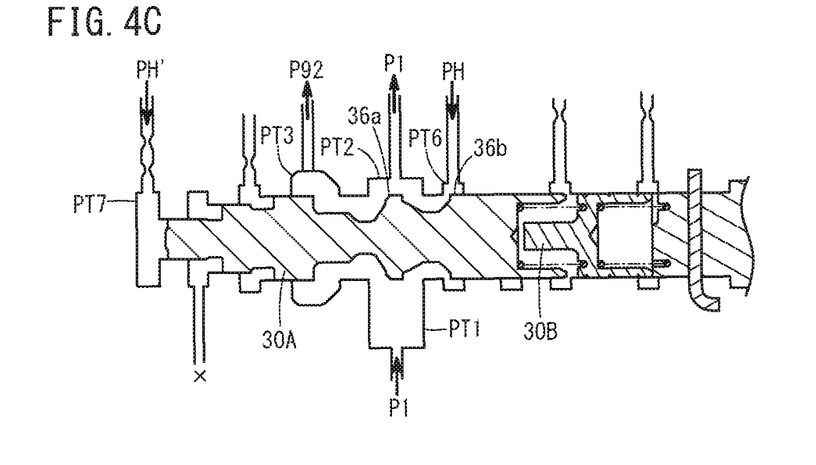
FIG. 4C is a cross-sectional view schematically showing a state in which the first spool is in a second position.
Figure 5:
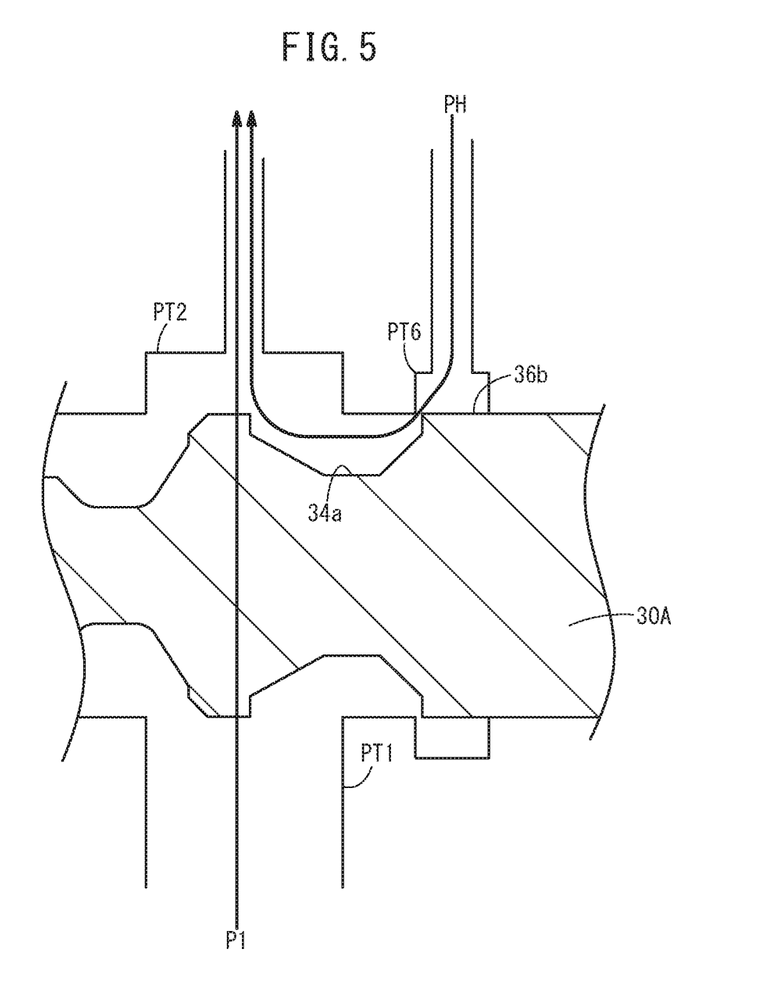
FIG. 5 is an enlarged cross-sectional view schematically showing a state in which the first spool is in the second position.

When the rotational speed N of the electric motor MOT of the electric oil pump OPb exceeds the appropriate rotational speed, the pilot pressure PH' becomes greater than the predetermined value, and as shown in FIG. 4C, the first spool 30A moves further toward the second spool 30B. As a result of such movement, when the first spool 30A arrives at the second position, a state is brought about in which blocking of the sixth port PT6 by the second outer circumferential surface 36b is released. Consequently, as shown in FIG. 5, the oil pressure PH from the fourth oil passage R4 is temporarily supplied into the sixth pressure control valve V6 through the sixth port PT6, however, the oil pressure PH also passes beyond the first annular groove 34a of the first spool 30A, and through the second port PT2, whereupon the oil pressure PH is discharged to the first oil passage R1 together with the oil flow from the first port PT1. More specifically, the pressure of the oil flow flowing through the third oil passage R3 can be released into the second port PT2, and rising of the pilot pressure PH' applied to the first spool 30A can be suppressed. As a result, as shown by the dashed line Lb in FIG. 3, it is possible to suppress a rise in the hydraulic pressure PH of the third oil passage R3.

In this manner, in the hydraulic control device 10 according to the present embodiment, there are included the mechanical oil pump OPa, the electric oil pump OPb having the electric motor MOT, the sixth pressure control valve V6 connected between the mechanical oil pump OPa and the electric oil pump OPb, the second flow passage R2 that supplies the oil flow from the electric oil pump OPb to the continuously variable transmission 12, and the third flow passage R3, which branches off from a midstream location of the second flow passage R2, and supplies a portion of the oil flow exiting from the electric oil pump OPb to the sixth pressure control valve V6.

The sixth pressure control valve V6 includes the first supply port PT1 to which the oil flow from the mechanical oil pump OPa is supplied, the second port PT2 that transmits the oil flow from the mechanical oil pump OPa to the electric oil pump OPb, the sixth port PT6 to which the oil flow from the third flow passage R3 is supplied, the seventh port PT7 to which the pilot pressure PH' from the third flow passage R3 is supplied, and the first spool 30A which is moved by the pilot pressure PH' supplied from the seventh port PT7.

When the rotational speed N of the electric motor MOT is the appropriate rotational speed, the first spool 30A is in the first position, in which communication between the sixth port PT6 and the second port PT2 is blocked, and when the rotational speed N of the electric motor MOT exceeds the appropriate rotational speed, the first spool 30A is in the second position, in which the sixth port PT6 and the second port PT2 are placed in communication.

More specifically, the electric oil pump OPb further pressurizes the hydraulic pressure which is supplied from the mechanical oil pump OPa through the sixth pressure control valve V6, and supplies it to the continuously variable transmission 12. Accordingly, in the case that the rotational speed N of the electric motor MOT of the electric oil pump OPb is not in excess of the appropriate rotational speed, then since the pilot pressure PH' is lower than the predetermined value, the first spool 30A is in the first position in which communication between the sixth port PT6 and the second port PT2 is blocked.

In addition, in the case that the rotational speed N of the electric motor MOT exceeds the appropriate rotational speed, since the pilot pressure PH' becomes greater than the predetermined value, the first spool 30A moves to the second position in which the sixth port PT6 and the second port PT2 are placed in communication. Consequently, due to the fact that the sixth port PT6 and the second port PT2 communicate with each other, the oil flow entering into the sixth pressure control valve V6 from the fourth oil passage R4 via the sixth port PT6 can be released into the second port PT2. More specifically, the pressure of the oil flow flowing through the third oil passage R3 can be released into the second port PT2, and rising of the pilot pressure PH' applied to the first spool 30A can be suppressed.

As a result, it is possible to prevent the first spool 30A of the sixth pressure control valve V6 from moving longer than its specified stroke, and it is possible to solve the problem in which the hydraulic pressure decreases when the first spool 30A returns. In addition, there is no need to install a hydraulic pressure sensor to detect the hydraulic pressure from the sixth pressure control valve V6, or to incorporate a separate control circuit, which is advantageous in terms of cost.

Further, according to the present embodiment, in the sixth pressure control valve V6, the second port PT2 and the sixth port PT6 are disposed adjacent to each other, and the second port PT2 and the sixth port PT6 are arranged in this order along a direction in which the first spool 30A is moved by the pilot pressure PH'.

When the first spool 30A is in the first position, the first port PT1 and the second port PT2 are placed in communication, and communication between the sixth port PT6 and the second port PT2 is blocked. Further, when the first spool 30A is in the second position, the first port PT1 and the second port PT2 are placed in communication, and the sixth port PT6 and the second port PT2 are placed in communication.

In accordance with these features, the following actions are exhibited. More specifically, since the first spool 30A is in the first position during the period in which the first spool 30A moves accompanying the rise in the pilot pressure PH', and the pilot pressure PH' is lower than the predetermined value, the oil flow from the mechanical oil pump OPa, which is supplied through the first port PT1, is supplied to the electric oil pump OPb through the second port PT2.

During the period in which the pilot pressure PH' is in excess of the predetermined value, the first spool 30A is placed in the second position, and therefore, the pressure of the oil flow that flows through the third oil passage R3 can be released through the sixth port PT6 and the second port PT2, and a rise in the pilot pressure PH' applied to the first spool 30A can be suppressed.

Further, in the present embodiment, there are included the low pressure operated device 24, and the ninth oil passage R9 that supplies the oil flow from the sixth pressure control valve V6 to the low pressure operated device 24. The sixth pressure control valve V6 has the third port PT3 that transmits the oil flow from the mechanical oil pump OPa to the low pressure operated device 24. When the first spool 30A is in the first position, communication between the first port PT1 and the third port PT3 is blocked, and when the first spool 30A is in the third position located more closely to the first position than the second position, the first port PT1 and the third port PT3 are placed in communication.

Consequently, in the case that the rotational speed N of the electric motor MOT of the electric oil pump OPb is not in excess of the appropriate rotational speed, since the pilot pressure PH' is lower than the predetermined value, the first spool 30A is placed in the first position. At this time, since communication between the first port PT1 and the third port PT3 is blocked, the oil flow supplied through the first port PT1 is supplied exclusively to the electric oil pump OPb through the second port PT2.

Since the electric oil pump OPb further pressurizes the hydraulic pressure which is supplied from the mechanical oil pump OPa through the sixth pressure control valve V6, and supplies it to the continuously variable transmission 12, the pilot pressure PH' supplied to the seventh port PT7 through the third oil passage R3 rises.

When the first spool 30A reaches the third position by elevation of the pilot pressure PH', the first port PT1 and the third port PT3 are placed in communication, and the oil flow supplied through the first port PT1 is supplied to the electric oil pump OPb through the second port PT2, together with being supplied to the low pressure operated device 24 through the third port PT3.

In addition, when the pilot pressure PH' further rises, exceeds the predetermined value, and the first spool 30A arrives at the second position, due to the fact that the sixth port PT6 and the second port PT2 are placed in communication, the oil flow from the electric oil pump OPb, which is supplied through the fourth oil passage R4 and the sixth port PT6, is supplied to the electric oil pump OPb through the second port PT2 and the first oil passage R1. More specifically, since the pressure of the oil flow flowing through the third oil passage R3 can be released into the second port PT2, rising of the pilot pressure PH' applied to the first spool 30A can be suppressed.

In this manner, in the hydraulic control device 10, which supplies the oil flow from the mechanical oil pump OPa to the electric oil pump OPb, as well as to the low pressure operated device 24, it is possible to prevent the first spool 30A of the sixth pressure control valve V6 from moving longer than its specified stroke, and it is possible to solve the problem in which the hydraulic pressure decreases when the first spool 30A returns. In addition, there is no need to install a hydraulic pressure sensor to detect the hydraulic pressure from the sixth pressure control valve V6, or to incorporate a separate control circuit, which is advantageous in terms of cost.

Further, according to the present embodiment, in the sixth pressure control valve V6, the third port PT3 and the second port PT2 are disposed adjacent to each other, the second port PT2 and the sixth port PT6 are disposed adjacent to each other, and the third port PT3, the second port PT2, and the sixth port PT6 are arranged in this order along the direction in which the first spool 30A is moved by the pilot pressure PH'.

When the first spool 30A is in the first position, the first port PT1 and the second port PT2 are placed in communication, while communication between the first port PT1 and the third port PT3 and communication between the second port PT2 and the sixth port PT6 are blocked.

When the first spool 30A is in the third position, the first port PT1 and the second port PT2 are placed in communication, and together therewith, the first port PT1 and the third port PT3 are placed in communication, and the second port PT2 and the third port PT3 are placed in communication.

When the first spool 30A is in the second position, the first port PT1 and the second port PT2 are placed in communication, together with the second port PT2 and the sixth port PT6 being placed in communication.

In accordance with these features, the following actions are exhibited. More specifically, the first spool 30A can be placed in the first position during the period in which the first spool 30A moves accompanying the rise in the pilot pressure PH', and the pilot pressure PH' is lower than the predetermined value, and during that period the oil flow from the mechanical oil pump OPa, which is supplied through the first port PT1, is supplied to the electric oil pump OPb through the second port PT2.

Thereafter, at the third position to which the first spool 30A moves accompanying the rise of the pilot pressure PH', and where the pilot pressure PH' is lower than the predetermined value, the oil flow supplied through the first port PT1 is supplied to the electric oil pump OPb through the second port PT2, together with being supplied to the low pressure operated device 24 through the third port PT3.

Thereafter, during the period in which the pilot pressure PH' is in excess of the predetermined value, the first spool 30A is placed in the third position, and the pressure of the oil flow that flows through the fourth oil passage R4 can be released into the first oil passage R1 through the second port PT2, and a rise in the pilot pressure PH' applied to the first spool 30A can be suppressed.

The present invention is not limited to the embodiment described above, and it is a matter of course that the invention can be freely modified within a range that does not depart from the essence and gist of the present invention as set forth in the appended claims.

What is claimed is:

1. A hydraulic control device comprising:
   a mechanical oil pump;
   an electric oil pump having an electric motor;
   a pressure control valve connected between the mechanical oil pump and the electric oil pump;
   a first flow passage adapted to supply an oil flow from the electric oil pump to a transmission; and
   a second flow passage, which branches off from a midstream location of the first flow passage, and is adapted to supply a portion of the oil flow exiting from the electric oil pump to the pressure control valve;
   wherein the pressure control valve includes:
   a first supply port to which an oil flow from the mechanical oil pump is supplied;
   a first discharge port adapted to transmit the oil flow from the mechanical oil pump to the electric oil pump;
   a second supply port to which the oil flow from the second flow passage is supplied;
   a third supply port to which a pilot pressure from the second flow passage is supplied; and
   a valve body which is moved by the pilot pressure supplied from the third supply port;
   wherein, when the rotational speed of the electric motor is an appropriate rotational speed, the valve body is in a first position, in which communication between the second supply port and the first discharge port is blocked, and when the rotational speed of the electric motor exceeds the appropriate rotational speed, the valve body is in a second position, in which the second supply port and the first discharge port are placed in communication.

2. The hydraulic control device according to claim 1, wherein:
   in the pressure control valve, the first discharge port and the second supply port are disposed adjacent to each other, and the first discharge port and the second supply port are arranged in this order along a direction in which the valve body is moved by the pilot pressure;
   when the valve body is in the first position, the first supply port and the first discharge port are placed in communication, and communication between the second supply port and the first discharge port is blocked; and
   when the valve body is in the second position, the first supply port and the first discharge port are placed in communication, and the second supply port and the first discharge port are placed in communication.

3. The hydraulic control device according to claim 1, further comprising:
   a low pressure operated device; and
   a low pressure side passage adapted to supply the oil flow from the pressure control valve to the low pressure operated device;
   wherein the pressure control valve has a second discharge port adapted to transmit the oil flow from the mechanical oil pump to the low pressure side passage;
   when the valve body is in the first position, communication between the first supply port and the second discharge port is blocked; and
   when the valve body is in a third position located more closely to the first position than the second position, the first supply port and the second discharge port are placed in communication.

4. The hydraulic control device according to claim 3, wherein:
   in the pressure control valve, the second discharge port and the first discharge port are disposed adjacent to each other, the first discharge port and the second supply port are disposed adjacent to each other, and the second discharge port, the first discharge port, and the second supply port are arranged in this order along a direction in which the valve body is moved by the pilot pressure;
   when the valve body is in the first position, the first supply port and the first discharge port are placed in communication, and communication between the first supply port and the second discharge port and communication between the first discharge port and the second discharge port are blocked;

when the valve body is in the third position, the first supply port and the first discharge port are placed in communication, the first supply port and the second discharge port are placed in communication, and the first discharge port and the second discharge port are placed in communication; and when the valve body is in the second position, the first supply port and the first discharge port are placed in communication, and the second supply port and the first discharge port are placed in communication.

5. The hydraulic control device according to claim 1, wherein:

the mechanical oil pump is a large capacity oil pump driven by an internal combustion engine; and the electric oil pump is a small capacity oil pump driven by the electric motor.

\* \* \* \* \*

UNITED STATES PATENT AND TRADEMARK OFFICE
CERTIFICATE OF CORRECTION

PATENT NO. : 10,514,039 B2
APPLICATION NO. : 15/986851
DATED : December 24, 2019
INVENTOR(S) : Ichimura et al.

It is certified that error appears in the above-identified patent and that said Letters Patent is hereby corrected as shown below:

In the Claims

Column 14, Claim 4, Lines 51-66, (approx.), it should read:
4. The hydraulic control device according to claim 3, wherein:
    in the pressure control valve, the second discharge port and the first discharge port are disposed adjacent to each other, the first discharge port and the second supply port are disposed adjacent to each other, and the second discharge port, the first discharge port, and the second supply port are arranged in this order along a direction in which the valve body is moved by the pilot pressure;
    when the valve body is in the first position, the first supply port and the first discharge port are placed in communication, and communication between the first supply port and the second discharge port and communication between the first discharge port and the second supply port are blocked;

Signed and Sealed this
Second Day of June, 2020

Andrei Iancu
*Director of the United States Patent and Trademark Office*